United States Patent [19]

Wideman et al.

[11] 3,842,832

[45] Oct. 22, 1974

[54] DISPOSABLE LAMINATE PRODUCT AND METHOD OF MAKING IT

[75] Inventors: Harold A. Wideman; Ronald H. Wideman, both of Menasha, Wis.

[73] Assignee: Poly Wide, Inc., Menasha, Wis.

[22] Filed: Oct. 6, 1972

[21] Appl. No.: 295,471

[52] U.S. Cl............... 128/169, 128/156, 156/229, 161/129
[51] Int. Cl. ............................................ A61f 13/00
[58] Field of Search.................. 128/169, 156, 155; 161/129, 128, 148, 73; 156/229

[56] References Cited
UNITED STATES PATENTS

| | | | |
|---|---|---|---|
| 2,299,988 | 10/1942 | Irving | 156/85 |
| 2,687,723 | 8/1954 | Stern | 128/169 |
| 3,122,140 | 2/1964 | Crowe, Jr. | 128/156 X |
| 3,301,257 | 1/1967 | Crowe, Jr. et al. | 128/156 X |
| 3,327,708 | 6/1967 | Sokolowski | 128/156 |
| 3,530,030 | 9/1970 | Adams et al. | 161/73 |
| 3,536,072 | 10/1970 | Quello | 128/169 |
| 3,575,782 | 4/1971 | Hansen | 128/156 X |
| 3,687,797 | 8/1972 | Wideman | 161/129 |

*Primary Examiner*—Richard A. Gaudet
*Assistant Examiner*—J. Yasko
*Attorney, Agent, or Firm*—Kinzer, Plyer, Dorn & McEachran

[57] ABSTRACT

A disposable, stretchable laminate product having an inner core of foam material and a method of making the same. The laminate has an inner core of cellular plastic material having compressible foam cells and outer layers of nonwoven material. The outer layers of nonwoven material are wrinkled with laterally extending undulations and the inner core of foam fills these undulations. Because of this construction, the laminate is stretchable only in a longitudinal direction. The laminate is made by stretching a cellular foamed plastic material, thereby reducing its width, adhering the nonwoven material to opposite sides of the foam material while it is stretched, wetting the laminate to relax the nonwoven material thereby permitting the cellular plastic core to return longitudinally to its unstretched position and drying the laminate.

8 Claims, 5 Drawing Figures

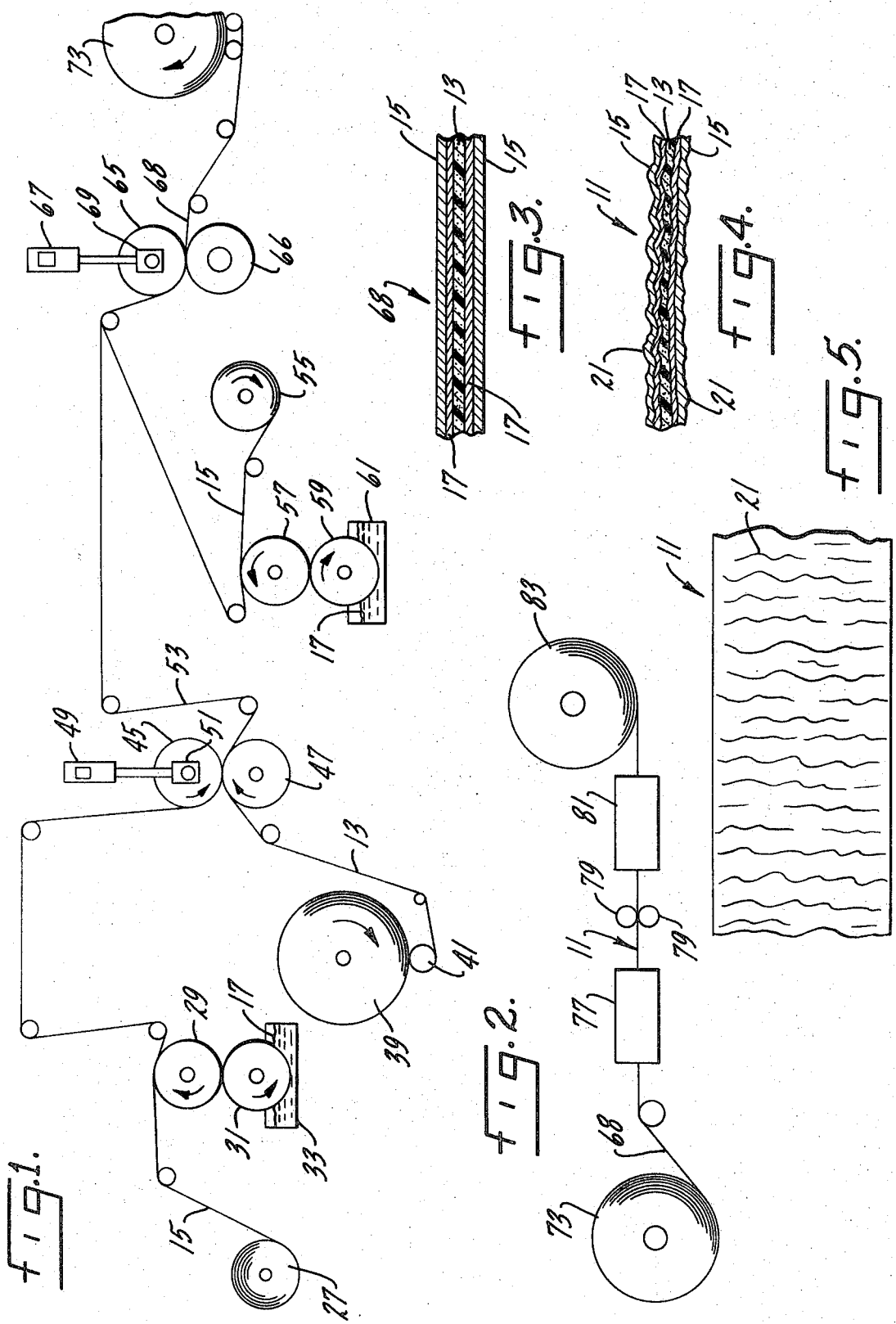

DISPOSABLE LAMINATE PRODUCT AND METHOD OF MAKING IT

SUMMARY OF THE INVENTION

This invention is directed to a disposable stretch product such as a bandage and a method of making it.

An object of this invention is a disposable stretch bandage which does not contain rubber.

Another object is a disposable stretch bandage which is stretchable only in one direction.

Another object is a disposable stretch bandage of laminated construction having an inner core of a cellular plastic material having compressible foamed cells.

Another object is a disposable stretch bandage of laminated construction having outer layers of nonwoven directionally oriented materials.

Another object is a disposable product such as a stretch bandage having wrinkled outer nonwoven surfaces.

Another object is a disposable stretch bandage having outer fabric surfaces which will not be over-stretched during use.

Another object is a method of manufacturing a disposable stretch bandage which utilizes the tendency of a foamed cellular plastic to shrink in width when it is stretched lengthwise.

Other objects may be found in the following specification, claims and drawings.

BRIEF DESCRIPTION OF THE DRAWINGS

The invention is illustrated more or less diagrammatically in the following drawings wherein:

FIG. 1 is a schematic flow diagram showing part of the process of manufacturing the product of this invention;

FIG. 2 is a schematic flow diagram showing the remaining portion of the process for making the product of this invention;

FIG. 3 is an enlarged cross-sectional view of the laminate product at one stage of manufacture;

FIG. 4 is an enlarged, cross-sectional view of the finished laminate product of this invention; and FIG. 5 is a top plan view of a portion of the finished laminate product of this invention.

DESCRIPTION OF THE PREFERRED EMBODIMENT

The novel product of this invention, which may be made by the method hereinafter described, may be formed in many shapes and sizes, may be fashioned from many basic materials and may have many functions and uses, however, for clarity and conciseness of illustration, it will be described in the form of an elongated strip usable primarily as a disposable stretchable bandage.

The disposable, stretchable bandage 11 shown in FIGS. 4 and 5, has an inner core 13 of cellular plastic material having compressible foam cells and outer layers 15 on opposite sides of the core formed of nonwoven material such as a fabric. The nonwoven outer layers are attached to the inner core of cellular plastic material by layers of adhesive 17.

In the specific example shown herein, the inner core 13 is an open cell polyurethane, the outer layers 15 of nonwoven fabric are oriented rayon and the adhesive is polyvinyl chloride. As can best be seen in FIG. 4, the polyurethane core 13 is in a somewhat relaxed condition when the bandage is in its finished state and ready for use. The foam polyurethane has laterally extending undulations and the outer layers of longitudinally oriented rayon follow the undulations forming wrinkles in the outer surfaces of the bandage.

The foregoing construction features permit the bandage to be stretched a sufficient degree to remove the wrinkles from the outer layers without over stretching the inner polyurethane core. The wrinkled surfaces of the outer layers 15 provide the bandage with a non-slip character which is extremely useful when applied to the human body. The bandage is stretchable only in its longitudinal direction, that is, across the wrinkles 21 and is not stretchable laterally, that is, in the direction along the troughs of the wrinkles. The novel features of this proudct are obtained from its method of manufacture, which is described as follows:

FIGS. 1 and 2 show schematically a method of manufacturing the product of this invention. A nonwoven fabric, in this case, a longitudinally oriented nonwoven rayon 15 is unwound from a roll 27 and passes over a roller 29 having one surface formed of a neoprene rubber having a Shore A durometer hardness of approximately 70. The roller 29 applies an adhesive to one surface of the rayon, the adhesive being, in this example, a polyvinyl chloride obtained from an anilox roller 31 which rotates through a reservoir 33 containing this adhesive. The size of the cells of the anilox roller 31 may be varied to vary the amount of polyvinyl chloride adhesive applied to the roller 29. The web 15 is moved along by rollers at a speed of approximately 50 feet per minute.

An open cell polyurethane 13 is fed from a roll 39 by a feed roll 41. The polyurethane is unrolled at a speed of 25 feet per minute and is brought into contact with the adhesive coated surface of the web of nonwoven rayon 15 between rollers 45 and 47. Roller 45 has a "TEFLON" plastic coated steel surface and is oil heated to a temperature of approximately 350°F. This roller is movable toward and away from roller 47. It is held in contact with the roller 47 by hydraulic cylinders 49. The hydraulic cylinders connect to roller 45 by means of slide blocks 51. Through the use of hydraulic cylinders 49 the pressure exerted by the roller against the webs 25 and 27 may be varied as required.

The roller 47 has an outer surface of silicone rubber having a Shore A durometer hardness of approximately 70. The outer surface of the roller 47 is rotated at a speed of 50 feet per minute. Thus, the polyurethane web 13 which is unwound from its roll 39 at a speed of 25 feet per minute, moves between the rollers 45, 47 at a speed of 50 feet per minute. This increase in speed causes a stretching of the polyurethane longitudinally and a reduction in width of the polyurethane from its original width of 53 inches on the roll 39 to a width of 42 inches when it is adhered to the web 15 of rayon which is also 42 inches wide. The laminate of rayon, polyvinyl chloride adhesive, and stretched foam polyurethane leaving the rollers 45, 47 will de designated as web 53.

A second web 15 of longitudinally oriented nonwoven rayon is unwound from roll 55 and is passed over roller 57 which has an outer surface of neoprene rubber having a Shore A 70 durometer hardness. The roller 57 applies an adhesive, in this case a polyvinyl chloride, to one surface of the web 15. The roller obtains the polyvinyl chloride from an anilox roller 59 which rotates in a reservoir 61 containing polyvinyl chloride. As with the anilox roller 31, the cell structure of this roller may be varied to vary the amount of adhesive applied to the roller 57.

The adhesive coated rayon web 15 is brought into contact with the surface of the polyurethane 13 forming a part of the urethane rayon laminate web 53 leaving rollers 45 and 47 is run between rollers 65, 66 where it is formed into a three part laminate web 68. Roller 65 has an outer surface of silicone rubber having a Shore A durometer hardness of 70. This roller is adjustable towards and away from roller 66 to exert pressure on the laminate web 68. The roller is movable by means of hydraulic cylinders 67 and slide blocks 69. The roller 66 has a "TEFLON" plastic coated steel surface and is oil heated to approximately 350°F. After passing through the rollers 65, 66 the three laminate web 68 is wound on roll 73.

A longitudinal cross-section of the laminate web 68 is shown in FIG. 3. This laminate consists of a stretched inner open cell foam polyurethane core 13 and outer unstretched nonwoven fabric layers 15 adhered to the foam core by layers of adhesive 17. At this stage in the manufacture, the laminated material has smooth unwrinkled outer surface and a stretched core 13 which is held in its stretched position by adhesion to the outer rayon fabric layers 15.

In the next step of the manufacturing process, the laminated web 68 is passed through a moistening device 77 which may be a container of water or a water spray apparatus. Also, although in this example, the process is shown as involving the rolling of the laminate web 68 on the roll 73 and then the unwinding before passing through the moistening step, it should be understood that this process could be a continuous operation and the laminate web 68 could be run directly through the moistening process afer leaving the rolls 65, 66.

The moistening of the laminate web 68 relaxes the engagement between the nonwoven fabric outer layers 15 and the adhesive 17 connecting these outer layers to the stretched foam polyurethane core 13. The relaxing of the engagement between the outer layers of nonwoven fabric and the inner core of stretch polyurethane, permits the inner core to relax and return to its original length, although not to its original width. As the polyurethane core returns to its original length, the outer layers of nonwoven fabric buckle or undulate forming the wrinkles 21. The foam polyurethane fills these wrinkles forming a product 11 having the cross-section shown in FIG. 4 of the drawings.

The wrinkled laminate 11 leaves the moistening unit 77 and moves through rollers 79 where excess moisture is removed. The wrinkled laminate product 11 then passes through a drier 81 which is preferably of the festoon type, and from the drier it is wound on a finished roll 83. The removal of water and drying of the laminate after the shrinking of the polyurethane core does not remove the wrinkled finish of the outer nonwoven fabric nor does it cause any change about in the relaxed condition of the foam core 13.

From the foregoing it should be apparent that this invention can be utilized to prepare laminate structures having an inner core of a foamed material such as polyurethane and an outer core of a nonwoven fabric. Such a laminate, depending on the components thereof, may be useful for many purposes, including use as a stretch bandage as indicated herein. However, the invention should not be limited to the manufacture of stretch bandages as the process described herein can be used for making many different types of products and the product described is susceptible of many uses. Therefore, the scope of the invention should be limited only to a broad interpretation of the claims attached hereto.

We claim:

1. A disposable elongated laminated stretch bandage including:
   an outer layer of nonwoven material on opposite sides of said bandage, and
   a layer of longitudinally stretchable foam material located between said outer layers of nonwoven material,
   said layers being adhered together over the entire extent in laterally extending undulations.

2. The bandage of claim 1 further characterized in that said nonwoven materials forming said outer layers are oriented to extend at right angles to the length of said undulations.

3. The bandage of claim 1 further characterized in that said layers are joined by adhesive.

4. The bandage of claim 3 further characterized in that said adhesive is polyvinyl chloride.

5. The bandage of claim 1 in which said outer layers of nonwoven material are rayon and said foam material is polyurethane.

6. A disposable, elongated laminated product including:
   an outer layer of nonwoven material on each side of said product,
   a layer of foam material located between said outer layers, and
   adhesive fastening said layers together over the entire extent,
   said outer layers being laterally extending undulations with said foam material filling said undulations.

7. The disposable product of claim 6 further characterized in that said foam material is stretched longitudinally and compressed laterally and is held against lateral expansion by said outer layers of nonwoven material.

8. The disposable product of claim 6 further characterized in that said outer layers are formed to be stretched sufficiently to remove said undulations without over stretching said layer of foam.

* * * * *